US011301226B2

(12) United States Patent
Dinh et al.

(10) Patent No.: US 11,301,226 B2
(45) Date of Patent: Apr. 12, 2022

(54) ENTERPRISE DEPLOYMENT FRAMEWORK WITH ARTIFICIAL INTELLIGENCE/MACHINE LEARNING

(71) Applicant: Dell Products L.P., Round Rock, TX (US)

(72) Inventors: Hung Dinh, Austin, TX (US); Shishir Kumar Parhi, Bangalore (IN); Sowmya K, Bangalore (IN); Shivangi Geetanjali, Dwarka (IN); Antarlina Tripathy, Jamshedpur (IN); Yash Khare, Satna (IN); Sashibhusan Panda, Ganjam (IN); Lakshman Kumar Tiwari, Ballia (IN); Sourav Datta, Bangalore (IN); Seshadri Srinivasan, Shrewsbury, MA (US); Panguluru Vijaya Sekhar, Bangalore (IN); Baishali Roy, Bangalore (IN); Sweta Kumari, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/674,557

(22) Filed: Nov. 5, 2019

(65) Prior Publication Data

US 2021/0132927 A1 May 6, 2021

(51) Int. Cl.

| | |
|---|---|
| ***G06F 9/44*** | (2018.01) |
| ***G06F 8/60*** | (2018.01) |
| ***G06F 17/16*** | (2006.01) |
| ***G06F 11/30*** | (2006.01) |
| ***G06N 20/00*** | (2019.01) |

(52) U.S. Cl.

CPC ............ *G06F 8/60* (2013.01); *G06F 11/3055* (2013.01); *G06F 17/16* (2013.01); *G06N 20/00* (2019.01)

(58) Field of Classification Search

CPC ..... G06F 8/33; G06F 8/60; G06F 8/65; G06F 11/3688; G06F 8/61

See application file for complete search history.

(56) References Cited

U.S. PATENT DOCUMENTS

| | | | | |
|---|---|---|---|---|
| 9,785,426 | B2 * | 10/2017 | Madanapalli | H04L 67/1097 |
| 10,318,882 | B2 * | 6/2019 | Brueckner | G06N 20/00 |
| 10,581,675 | B1 * | 3/2020 | Iyer | G06F 8/71 |
| 2018/0018587 | A1 * | 1/2018 | Kobayashi | G06N 20/00 |
| 2019/0171948 | A1 * | 6/2019 | Pillai | G06N 5/04 |

(Continued)

OTHER PUBLICATIONS

BMC Software, "Job Scheduling and Workload Automation," https://www.bmcsoftware.in/it-solutions/job-scheduling-workload-automation.html, 2019, 17 pages.

(Continued)

*Primary Examiner* — Wei Y Zhen
*Assistant Examiner* — Amir Soltanzadeh
(74) *Attorney, Agent, or Firm* — Ryan, Mason & Lewis, LLP

(57) ABSTRACT

A method comprises managing multiple tasks of multiple entities associated with a deployment of a software program with a deployment framework comprising a machine learning module configured to assist with managing the multiple tasks of the multiple entities. The managing step comprises tracking a status of one or more of the multiple tasks, and predicting a time taken for a given one of the multiple entities to complete a given one of the multiple tasks.

20 Claims, 10 Drawing Sheets

(56) References Cited

U.S. PATENT DOCUMENTS

| | | | | |
|---|---|---|---|---|
| 2019/0317737 | A1* | 10/2019 | Metsch | G06N 3/08 |
| 2020/0019493 | A1* | 1/2020 | Ramakrishna | G06F 11/3692 |
| 2020/0027210 | A1* | 1/2020 | Haemel | G06F 9/5038 |
| 2020/0289925 | A1* | 9/2020 | Norton | G06F 16/9535 |

OTHER PUBLICATIONS

Wikipedia, "Peer-to-Peer," https://en.wikipedia.org/wiki/Peer-to-peer, Oct. 22, 2019, 15 pages.

Wikipedia, "PostgreSQL," https://en.wikipedia.org/wiki/PostgreSQL, Oct. 28, 2019, 24 pages.

* cited by examiner

200

210

0804 Release Details:

Pre Deployment Plan:

| Step 211 | Team 212 | Time 213 | | |
|---|---|---|---|---|
| Peer Review | AIC Team | 60 mins | START 214 | COMPLETE 215 |
| Support KT | L2 Team | 30 mins | START | COMPLETE |

Pre Deployment Plan:

Pre Deployment Plan:

Pre Deployment Plan:

| Component No | P2P | BATCH | Collection Distribution | Web Service | Support Portal Property Migration | GII Property Migration | Channel Polar Creation | Binding of PCF Service | PCF Service Validation | Table Creation | Layer 7 | Control-m Job Validation | Inventory Validation | MOM Provider Validation |
|---|---|---|---|---|---|---|---|---|---|---|---|---|---|---|
| 1 | 1 | 0 | 0 | 0 | 0 | 1 | 1 | 0 | 0 | 0 | 0 | 0 | 1 | 1 |
| 6 | 3 | 1 | 1 | 1 | 1 | 3 | 2 | 0 | 0 | 2 | 1 | 1 | 6 | 6 |
| 18 | 6 | 4 | 4 | 4 | 4 | 4 | 2 | 0 | 3 | 0 | 6 | 2 | 18 | 2 |
| 4 | 1 | 1 | 1 | 1 | 1 | 1 | 1 | 0 | 0 | 3 | 1 | 1 | 4 | 3 |
| 1 | 0 | 0 | 1 | 0 | 0 | 1 | 1 | 0 | 1 | 0 | 0 | 1 | 1 | 1 |

502

503

```
import pickle

output = open('rf_model.pkl', 'wb')
# Save the trained model as a pickle string.
saved_rf_model = pickle.dump(rf_model,output)

# Load the pickled model
pkl_file = open('rf_model.pkl','rb')
rf_from_pickle = pickle.load(pkl_file)

# Use the loaded pickled model to make predictions
rf_from_pickle.predict(test_features)
```

```
]: array([180. , 120. , 95. , 30. , 60. , 40. , 30. , 40. , 45. ,
        47.5, 45. , 50. , 125. , 30. , 47.5, 122.5, 120. , 20. ,
        30. , 15. , 95. , 45. , 30. , 60. , 215. , 95. , 220. ,
        20. , 30. , 90. , 95. , 75. , 47.5, 30. , 20. , 60. ,
        40. , 122.5, 35. , 15. , 60. , 95. , 40. , 170. , 100. ,
        45. , 160. , 30. , 125. , 180. , 95. , 225. ])
```

FIG. 5

ENTERPRISE DEPLOYMENT FRAMEWORK WITH ARTIFICIAL INTELLIGENCE/MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for providing an improved enterprise deployment framework in such information processing systems.

BACKGROUND

Enterprise deployment typically refers to processes that occur in order to release a product for end user availability. In the example of enterprise deployment of a software application program (application), deployment typically involves multiple teams in the enterprise (e.g., developers, release management personnel, and other stakeholders) performing their dedicated tasks in order to enable deployment of the application to the end users. Deployment can be a recurring phase of the application development lifecycle, since software is constantly being upgraded to fix bugs or add new features. Thus, with the multiple teams involved in deployment, tracking progress and accountability is a significant challenge leading to information silos and lost communication, with less and less control over the entire product delivery.

SUMMARY

Embodiments provide an enterprise deployment framework in an information processing system.

For example, in one embodiment, a method comprises managing multiple tasks of multiple entities associated with a deployment of a software program with a deployment framework comprising a machine learning module configured to assist with managing the multiple tasks of the multiple entities.

Advantageously, illustrative embodiments provide an enterprise deployment framework in the form of a generic application that helps enterprise teams to ease the release process by predicting the time taken by each team for their deployment tasks. The framework comprises an artificial intelligence/machine learning (AI/ML) component to provide such functionalities. If an accuracy percentage of predicting the tasks falls below a safe-level, in illustrative embodiments, the AI/ML component recommends next sets of action based on launch orchestration program (LOP) processes. LOP processes provide control of the deployment activities. LOP activities are tracked and notified in real-time with end-to-end visibility. The framework is effectively a one stop destination release tool for developers, release management teams and the stake holders to manage all deployment activities in real-time.

Furthermore, in illustrative embodiments, the framework provides a generic light-weight, approval workflow process for LOP tasks by required approvers. The framework optimizes the release process by programmatically sending alerts/notifications to cross team collaborations if a dependent task is completed. In some examples, enterprise teams have read-only access to the pre-release validation, release and post release validation tasks.

Further advantages include, but are not limited to: automation, virtualized/cloud platforms enablement and support; flexibility for adding any number of applications or interlocks; flexibility to handle heterogeneous applications; very lightweight platform because of usage of microservices and advanced technologies; optimized method to implement a logging mechanism using elastic search design; and ease-of-use and business functioning without information technology (IT) dependency.

These and other features and advantages of the embodiments will become more readily apparent from the accompanying drawings and the following detailed description.

BRIEF DESCRIPTION OF THE DRAWINGS

FIGS. 2A through 2D depict exemplary user interfaces for an enterprise deployment framework, according to an illustrative embodiment.

FIG. 5 depicts an exemplary model for a random forest algorithm with sample data, according to an illustrative embodiment.

DETAILED DESCRIPTION

Figure 1:
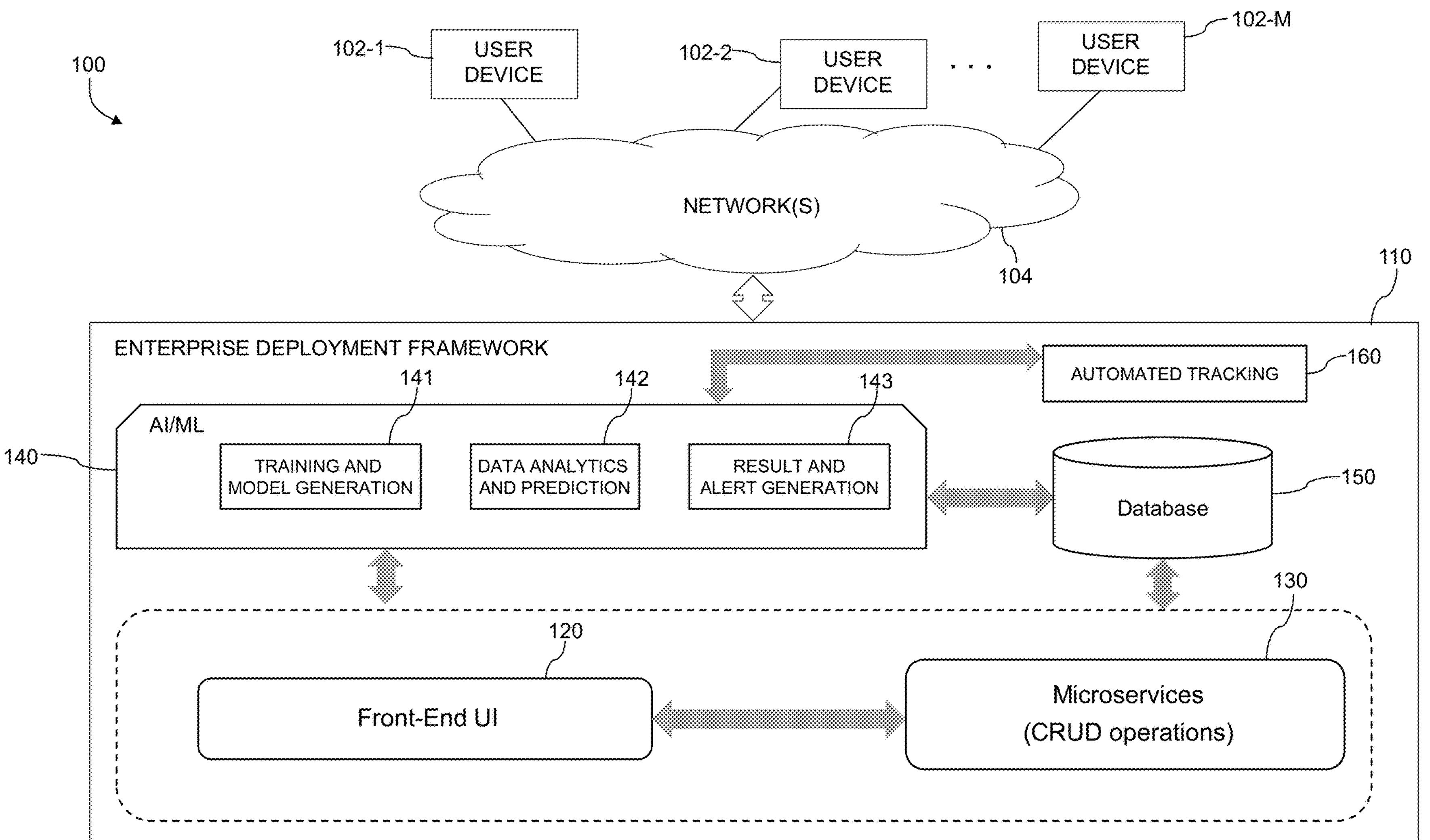
FIG. 1 depicts an information processing system with an enterprise deployment framework, according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, "application programming interface (API)" refers to a set of subroutine definitions, protocols, and/or tools for building software. Generally, an API defines communication between software components. APIs permit programmers to write software applications consistent with an operating environment or website.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with an enterprise deployment framework 110.

The user devices 102 can comprise, for example, Internet of Things (IoT) devices, desktop, laptop or tablet computers, mobile telephones, or other types of processing devices capable of communicating with the enterprise deployment framework 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K and L are assumed to be arbitrary positive integers greater than or equal to two.

The terms "client" or "user" herein are intended to be broadly construed so as to encompass numerous arrangements of human, hardware, software or firmware entities, as well as combinations of such entities. Enterprise deployment services may be provided for users utilizing one or more machine learning models, although it is to be appreciated that other types of infrastructure arrangements could be used. At least a portion of the available services and functionalities provided by the enterprise deployment framework 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the enterprise deployment framework 110, as well as to support communication between the enterprise deployment framework 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the enterprise deployment framework 110.

The enterprise deployment framework 110 in the present embodiment is assumed to be accessible to the user devices 102 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The enterprise deployment framework 110, on behalf of respective infrastructure tenants each corresponding to one or more users associated with respective ones of the user devices 102 provides a platform for using machine learning to accurately predict entity task completion times in connection with the software deployment.

Referring to FIG. 1, the enterprise deployment framework 110 includes a front-end user interface (UI) component 120, a microservices component 130, an artificial intelligence/machine learning (AI/ML) engine 140, a database 150, and an automated tracking component 160. The AI/ML engine 140 includes a training and model generation component 141, a data analytics and prediction component 142 and a result and alert generation component 143.

According to one or more embodiments, the front-end UI 120 component is hosted in a cloud platform server. The front-end UI 120 component calls APIs (e.g., representational state transfer (REST) APIs) corresponding to microservices in the microservices component 130. The microservices component 130 is configured as a microservice-based software architecture composed of multiple different fine-grained services with lightweight protocols, whereby microservices corresponding to different features of an application may be independently developed, deployed and scaled. For example, the front-end UI component 120 routes requests for create, read, update, and delete (CRUD) operations to the appropriate microservice of the microservices component 130. The microservices component 130 can process user requests received through user interfaces on user devices 102 by invoking multiple microservices from one or more back-ends and compiling the results. The user interfaces, discussed in more detail in connection with FIGS.

2A-2D, are generated and managed by the front-end UI component 120. Like the front-end UI component 120, the microservices component 130 may also be hosted in a cloud platform server.

The microservices component 130 connects with the database 150 to retrieve release details in connection with enterprise deployment of a software application program to end users by multiple teams in the enterprise (e.g., developers, release management personnel, and other stakeholders). The release details, such as, for example, the time taken by teams to complete their deployment tasks, are predicted by the AI/ML, engine 140. The release detail predictions are visible to users on respective user interfaces on their corresponding user devices 102.

According to one or more embodiments, the database 150 can be configured according to a relational database management system (RDBMS) (e.g., PostgreSQL). The database 150 in some embodiments is implemented using one or more storage systems or devices associated with the enterprise deployment framework 110. In some embodiments, one or more of the storage systems utilized to implement the database 150 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Figure 2A:
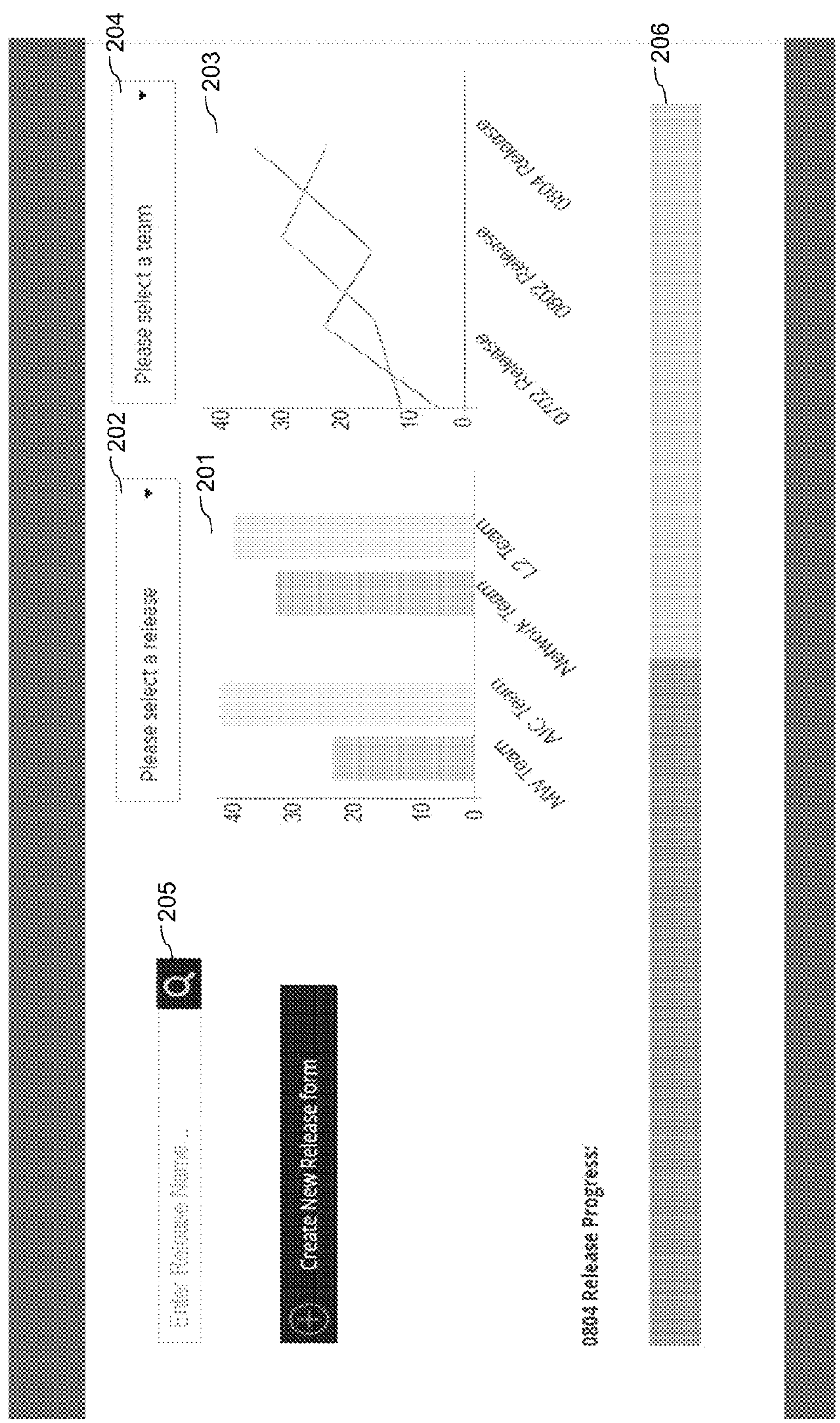

Referring to FIG. 2A, the user interface 200 comprises a dashboard screen (e.g., landing page). The user interface 200 shows graphical visualizations of application releases and corresponding development team data. For example, the graph 201 illustrates the time taken per team for a particular release, which can be chosen from the drop down menu 202. The graph 203 illustrates the time taken for different releases by a particular team, where the particular team can be chosen from the drop down menu 204. In the graphs 201 and 203, the vertical axis (y-axis) includes time intervals (e.g., hours, days, weeks, months, etc.).

The interface 200 further includes a search bar 205, which a user can use to search for any release. On selecting the search for a release, the release details will populate in the interface 210 shown in FIG. 2B. The interface 200 further includes a progress bar 206 indicating a status of the progress of an application release (e.g., how far along in a development process is the release). The progress bar 206 provides an indication of whether the release is, for example, a quarter of the way, halfway or three-quarters of the way through a development process.

The interface 210 shown in FIG. 2B provides a user with a visualization of release details. The interface 210 illustrates tasks (e.g., steps) 211 divided according to type (e.g., Peer Review, Support) with the time 213 allocated for the step, and the team 212 assigned for the step. The start and the complete buttons 214 and 215 are enabled only for the teams assigned to the corresponding step, and are used for capturing the actual time taken to complete a task. For example, a team member can activate the start button 214 upon commencement of a step 211 and activate the complete button 215 upon completion of the step 211. The enterprise deployment framework 110 records the time elapsed between activating the start and complete buttons 214 and 215. As explained further herein, an automated tracking component 160 of the enterprise deployment framework 110 monitors in real-time the performance of tasks in the software release process, whether the tasks have been completed, and the enterprise deployment framework 110 provides notifications to users regarding the status of tasks.

Figure 2C:
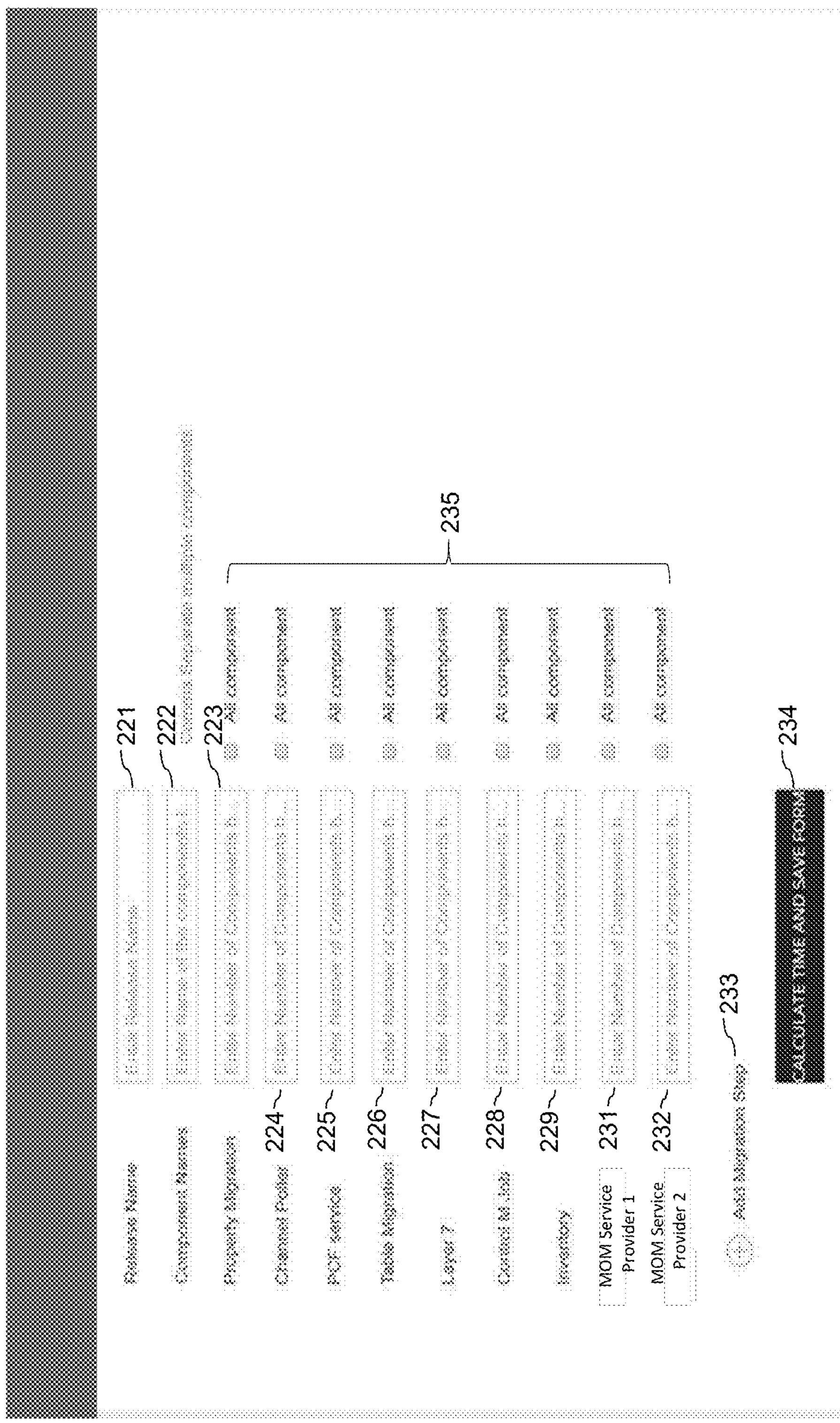

The interface 220 shown in FIG. 2C provides a user with a form to create a new release. The interface 220 includes a fields 221 and 222 for entering a valid release name and the names of the components involved with the release. As indicated, multiple components can be separated by commas. In fields 223, 224, 225, 226, 227, 228, 229, 231 and 232, a user specifies the number of components having to perform the corresponding tasks (e.g., migration steps) involved with the release. The tasks are identified as, but are not necessarily limited to, property migration, channel poller, PCF service, table migration, Layer 7, Control-M job, inventory, first message-oriented middleware (MOM) provider validation, second MOM provider validation, etc.). If all of the components are needed for a particular migration step, then a user can select the "All component" option 235. According to an embodiment, the number of components can be populated to conform with the comma separated component names entered previously. If any new tasks are involved for a particular release, a user can use the "add migration step" option 233 to add a new migration step by clicking the+sign. Components involved with or having to perform a task can include, but are not necessarily limited to, arrangements of human entities (e.g., developers, release management teams), hardware entities, software entities or firmware entities, as well as combinations of such entities.

Figure 2D:
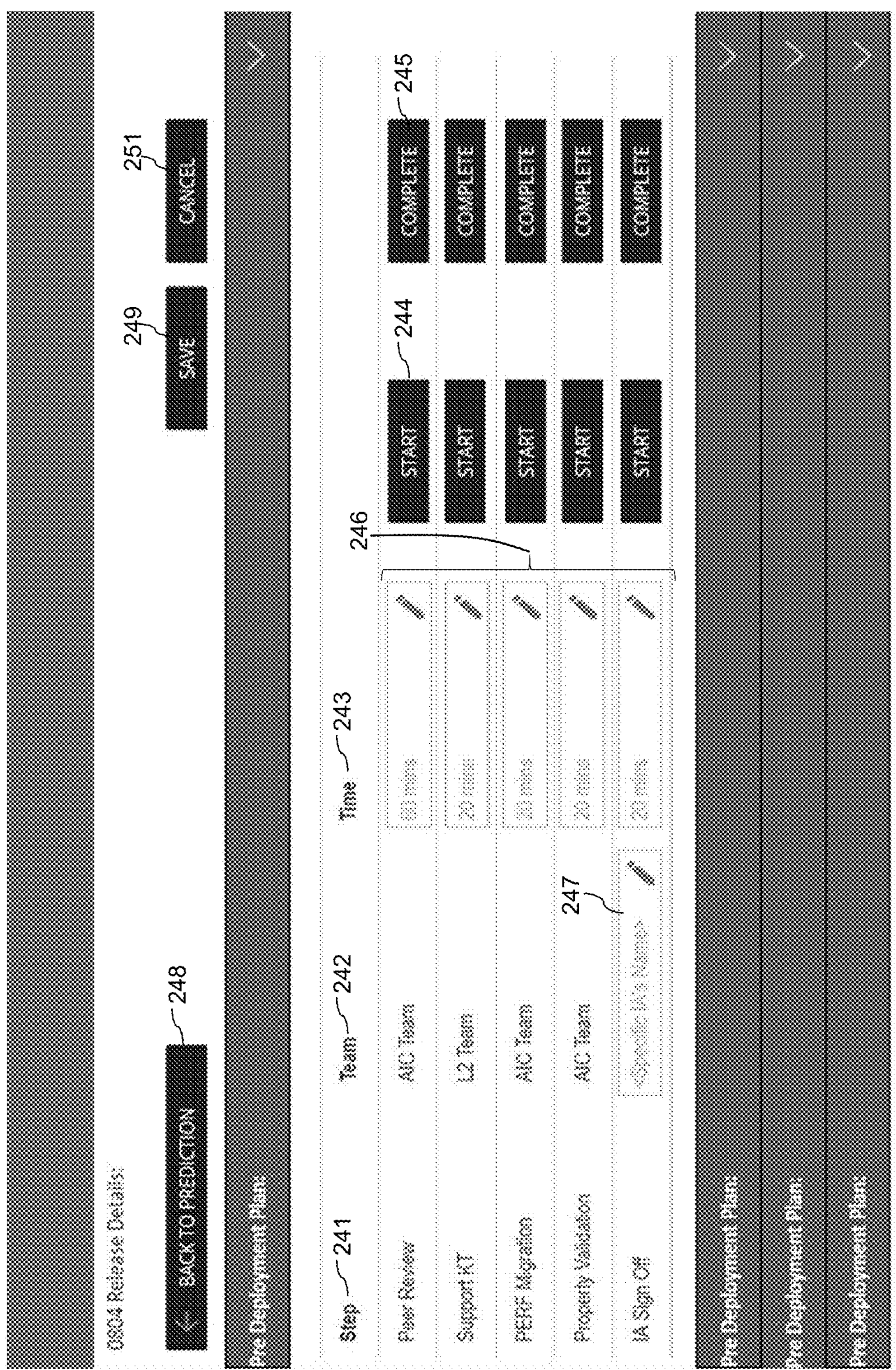

On clicking the "Calculate Time and Save Form" button 234, the data analytics and prediction component 142 of the AI/ML engine 140 predicts the time to complete each release task. The result and alert generation component 143, in conjunction with the front-end UI component 120, provides the data for and generates the interface 240 (FIG. 2D) including the predicted times, which can be viewed on a user device 102. The interface 240 shown in FIG. 2D provides a user with a visualization of the migration step time 243 for each step 241 as predicted by the AWL engine 140. The team 242 associated with each step 241 is also listed. If a user is not satisfied with the predicted times 243, the user can edit the time in the editable boxes 246. The training and model generation component 141 of the AI/ML engine 140 may be continuously updated based on feedback including, for example, user edits of the predicted times.

In addition, a user can also specify a team name for a task in an editable box, such as editable box 247. The user has the option of accepting the predictions and saving the form (save option 249) or canceling the predictions (cancel option 251). Upon selecting the save option 249, a warning message is generated, which indicates that a particular task may take more time than what is listed to indicate that the times are predictions, and not actual times. In selecting the "Back to Prediction" button 248, a user can return to the interface 220 to change inputted values and have the AWL engine 140 calculate the predicted times again. Similar to the start and complete buttons 214 and 215 discussed in connection with FIG. 2B, the start and the complete buttons 244 and 245 are enabled only for the teams assigned to the corresponding step, and are used for capturing the actual time taken to complete a task.

In generating the predicted times in connection with the interface 240, the data analytics and prediction component 142 of the AI/ML engine 140 analyzes a plurality of features using one or more machine learning algorithms, such as, but not necessarily limited to, a random forest regressor model, a support vector machine (SVM) and/or neural networks. The features which are input to the machine learning models to predict the times to complete each release task include, but are not necessarily limited to, a number of components having to perform the tasks, a number of components corresponding to peer-to-peer (P2P) architectures and the partitioning of tasks or workloads between peer nodes, a number of components corresponding to batch processing arrangements, a number of components involved in and/or steps for the collection and distribution of data, a number of components using web services, a number of components performing support portal property migration, a number of components performing version control system (e.g., “Git”) property migration (as used herein, a “Git” refers to a distributed version control system to manage code history), a number of components performing channel poller creation, a number of components performing binding cloud platform (e.g., PCF) services, a number of components performing cloud platform validation, a number of components performing table creation, a number of components performing gateway (e.g., Layer 7) creation, workload automation and job scheduling (e.g., Control-M) validation, a number of components performing inventory validations and a number of components performing message-oriented middleware (MOM) provider validation. In addition to the number of components, data concerning which components are performing particular tasks can also be collected and input to AI/ML engine 140 for analysis using one or more of the machine learning models.

Figure 3:
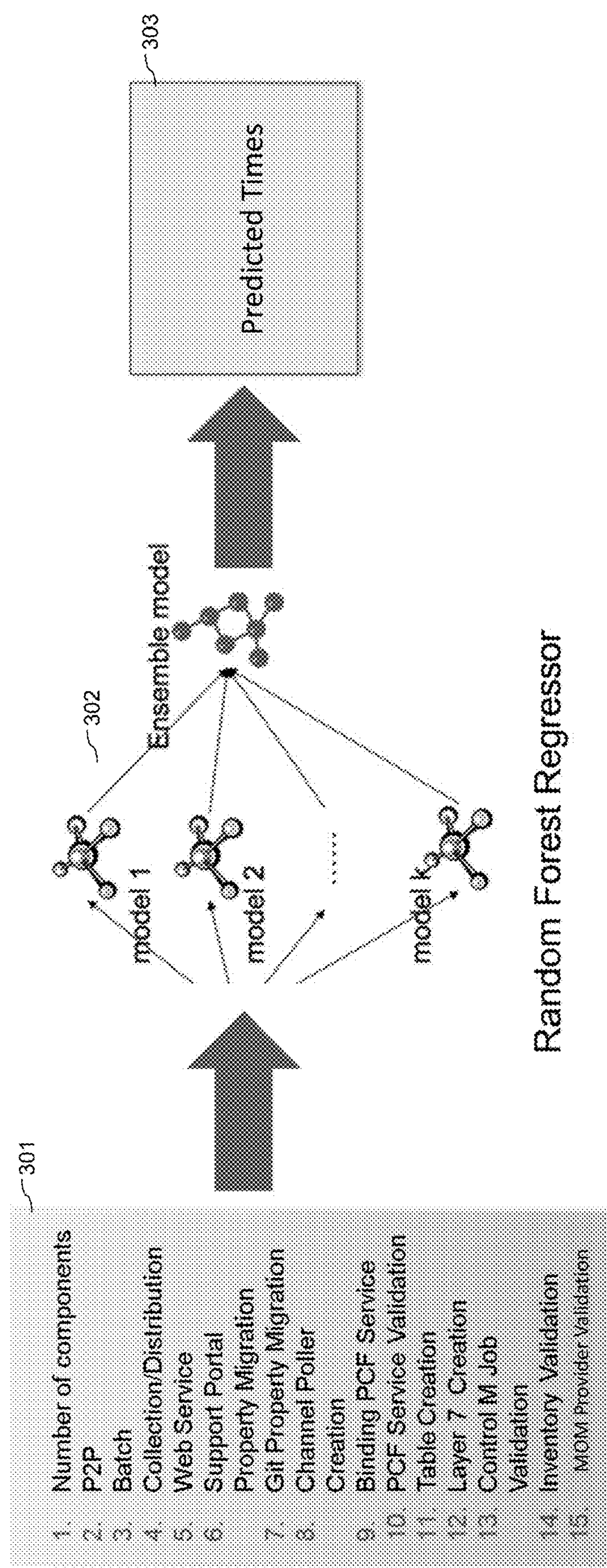
FIG. 3 depicts a random forest model of an AWL component associated with an enterprise deployment framework, according to an illustrative embodiment.

Referring to FIG. 3, a 15 dimensional feature vector 301 including the features noted above is input to a random forest regressor model 302, which outputs the predicted times 303 to complete each release task. According to one or more embodiments, the values for the features are entered by a user via the user interface 220 in FIG. 2C or other similar interface. It is to be understood that the noted features are provided by way of example, and that additional features may also be used. Additionally, the number of features used in the prediction analysis and/or training is not limited to 15, and there may be more or less features applied to the AI/ML engine 140 based on user unput. The outputted predicted times 303 are stored in the database 150 for retrieval by the microservices component 130 and the front-end UI component 120 for incorporation into user interfaces, such as, for example, user interface 240.

Referring to FIG. 5, the features 501 are used by the training and model generation component 141 to train the machine learning models used by the AI/ML engine 140 for time prediction. The features 501 are the same as the features in the feature vector 301. FIG. 5 includes the top 5 rows of training data 502, and sample code 503 for saving the trained model and the predictions made by the model on test data. When compared with some other models, the random forest regressor model provides relatively high accuracy based on sparse amounts data and requires less data to train.

Figure 4:
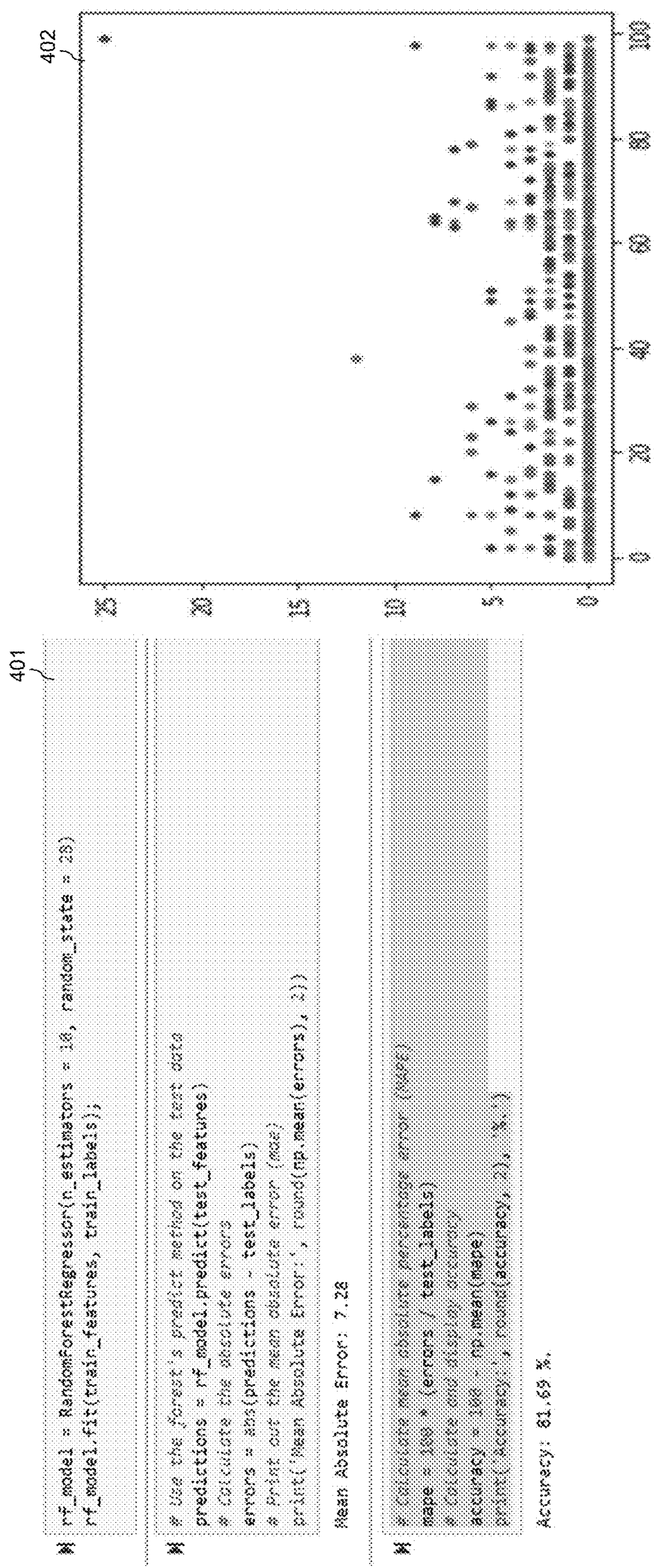
FIG. 4 depicts exemplary code for a random forest algorithm with sample data, according to an illustrative embodiment.

FIG. 4 includes sample code 401 to show mean absolute error and accuracy of a trained model, and a visualization 402 of the training data. As shown in FIG. 4, the mean absolute error of a trained random forest regressor model is 7.28, and the accuracy is 81.69%. According to one or more embodiments, if the accuracy percentage of the trained model falls below a given threshold level, the result and alert generation component 143 recommends one or more remedial actions to users. For example, if the accuracy percentage of predicting the times to complete tasks falls below a determined safe-level, the AWL engine 140 recommends remedial action based on LOP processes.

The automated tracking component 160 performs real-time tracking and monitoring of developer team performance of software deployment tasks and collaboration between teams. In addition, the automated tracking component 160, in conjunction with the result and alert generation component 143, is configured for optimizing the release process by programmatically sending alerts and/or notifications to collaborating teams when dependent tasks have been completed. The automated tracking component 160 tracks all LOP activities in real-time, and notifies developers, release management teams, and other stakeholders of the LOP activities in real-time to provide end-to-end visibility.

Although shown as an element of the enterprise deployment framework 110 in this embodiment, the AWL engine 140 in other embodiments can be implemented at least in part externally to the enterprise deployment framework 110, for example, as a stand-alone server, set of servers or other type of system coupled to the network 104. For example, the AWL engine 140 may be provided as a cloud service accessible by the enterprise deployment framework 110.

The AWL engine 140 in the FIG. 1 embodiment is assumed to be implemented using at least one processing device. Each such processing device generally comprises at least one processor and an associated memory, and implements one or more functional modules for controlling certain features of AWL engine 140.

Although shown as elements of the enterprise deployment framework 110, the front-end UI component 120, microservices component 130, AWL engine 140, database 150 and/or automated tracking component 160 in other embodiments can be implemented at least in part externally to the enterprise deployment framework 110, for example, as stand-alone servers, sets of servers or other types of system coupled to the network 104. For example, the front-end UI component 120, microservices component 130, AI/ML engine 140, database 150 and/or automated tracking component 160 may be provided as cloud services accessible by the enterprise deployment framework 110.

The front-end UI component 120, microservices component 130, AI/ML engine 140, database 150 and/or automated tracking component 160 in the FIG. 1 embodiment are each assumed to be implemented using at least one processing device. Each such processing device generally comprises at least one processor and an associated memory, and implements one or more functional modules for controlling certain features of the front-end UI component 120, microservices component 130, AI/ML engine 140, database 150 and/or automated tracking component 160.

At least portions of the enterprise deployment framework 110 and the components thereof may be implemented at least in part in the form of software that is stored in memory and executed by a processor. The enterprise deployment framework 110 and the components thereof comprise further hardware and software required for running the enterprise deployment framework 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the front-end UI component 120, microservices component 130, AI/ML, engine 140, database 150, automated tracking component 160 and other components of the enterprise deployment framework 110 in the present embodiment are shown as part of the enterprise deployment framework 110, at least a portion of the front-end UI component 120, microservices component 130, AWL engine 140, database 150, automated tracking component 160 and other components of the enterprise deployment framework 110 in other embodiments may be implemented on one or more other processing platforms that are accessible to the enterprise deployment framework 110 over one or more networks. Such components can each be implemented at least in part within another system element or at least in part utilizing one or more stand-alone components coupled to the network 104.

It is assumed that the enterprise deployment framework 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the front-end UI component 120, microservices component 130, AWL engine 140, database 150, automated tracking component 160 and other components of the enterprise deployment framework 110, and the elements thereof can each be implemented in the form of one or more LXCs running on one or more VMs. Other arrangements of one or more processing devices of a processing platform can be used to implement the front-end UI component 120, microservices component 130, AI/ML engine 140, database 150, and automated tracking component 160, as well as other components of the enterprise deployment framework 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the enterprise deployment framework 110 to reside in different data centers. Numerous other distributed implementations of the enterprise deployment framework 110 are possible.

Accordingly, one or each of the front-end UI component 120, microservices component 130, AWL engine 140, database 150, automated tracking component 160 and other components of the enterprise deployment framework 110 can each be implemented in a distributed manner so as to comprise a plurality of distributed components implemented on respective ones of a plurality of compute nodes of the enterprise deployment framework 110.

It is to be appreciated that these and other features of illustrative embodiments are presented by way of example only, and should not be construed as limiting in any way.

Accordingly, different numbers, types and arrangements of system components such as the front-end UI component 120, microservices component 130, AI/ML engine 140, database 150, automated tracking component 160 and other components of the enterprise deployment framework 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the enterprise deployment framework can be offered to cloud infrastructure customers or other users as part of FaaS, CaaS and/or PaaS offerings.

Illustrative embodiments of systems with an enterprise deployment framework as disclosed herein can provide a number of significant advantages relative to conventional arrangements. For example, one or more embodiments are configured to use machine learning in connection with the prediction of the time that will be taken by a deployment team to complete their assigned tasks. The embodiments also provide a framework for real-time tracking, notification and collaboration in connection with the deployment of software applications. Unlike current approaches, the embodiments provide a single channel for collaboration and communication between the various entities responsible for application deployment.

Advantageously, according to one or more embodiments, machine learning techniques are leveraged to recommend remedial action based on LOP processes when the accuracy percentage of predicting deployment team task times falls below acceptable levels. Additionally, all LOP activities are tracked in real-time, and notifications about the status of the tracked activities are provided to users in real-time to provide end-to-end visibility.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the enterprise deployment framework 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and an enterprise deployment framework in illustrative embodiments. These and other cloud-based systems in illustrative embodiments can include object stores.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
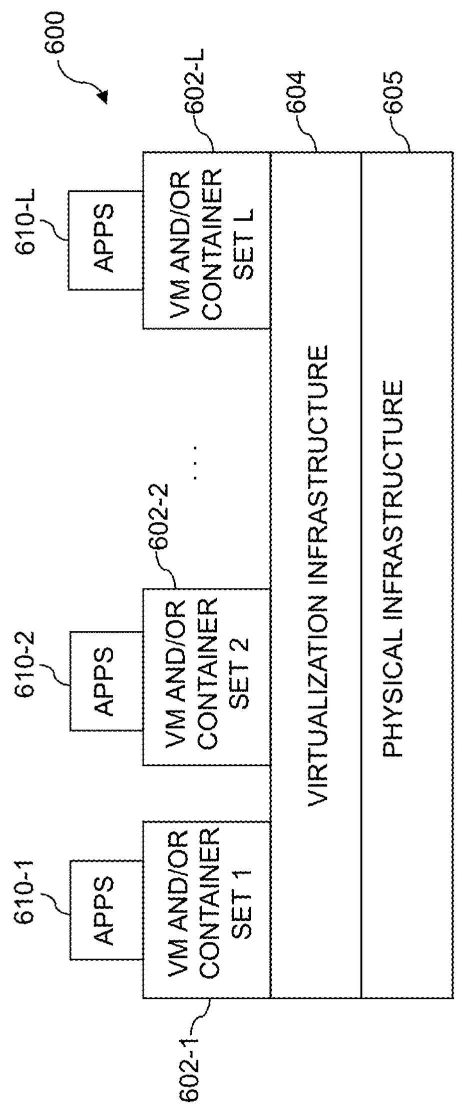
FIGS. 6 and 7 show examples of processing platforms that may be utilized to implement at least a portion of an information processing system in illustrative embodiments.
Figure 7:
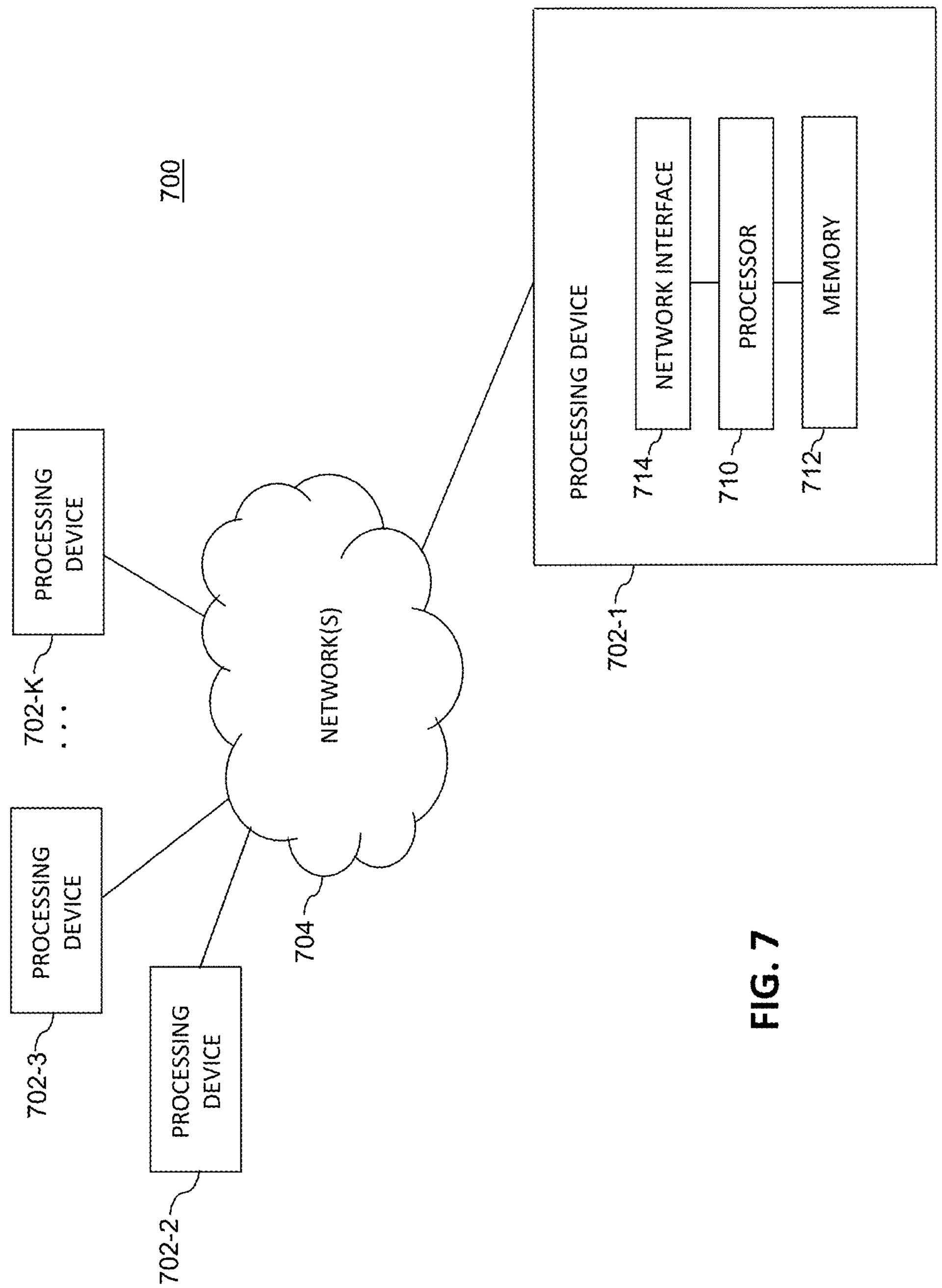

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the enterprise deployment framework 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and enterprise deployment frameworks. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

managing multiple tasks of multiple entities associated with a deployment of a software program with a deployment framework comprising a machine learning module configured to assist with managing the multiple tasks of the multiple entities, wherein the managing step comprises predicting a time taken for a given one of the multiple entities to complete a given one of the multiple tasks;

receiving a modification to the predicted time; and inputting the modification as training data to a machine learning model executed by the machine learning module;

wherein the predicting step comprises inputting a multi-dimensional feature vector to the machine learning model executed by the machine learning module;

wherein features of the multi-dimensional feature vector comprise:

data identifying each of the multiple tasks;

data identifying a number of the multiple entities performing each of the multiple tasks; and data identifying which of the multiple entities are performing each of the multiple tasks;

wherein the data identifying which of the multiple entities are performing each of the multiple tasks comprises data identifying one or more components performing version control for code management, gateway creation and message-oriented-middleware provider validation in connection with a release of the software program;

wherein the training data for the machine learning model further comprises the features of the multi-dimensional feature vector; and wherein the steps of the method are executed by a processing device operatively coupled to a memory.

2. The method of claim 1, wherein the managing step further comprises tracking a status of one or more of the multiple tasks.

3. The method of claim 2, wherein the tracking is performed in real-time.

4. The method of claim 2, wherein the managing step further comprises notifying one or more of the multiple entities regarding the status of one or more of the multiple tasks.

5. The method of claim 1, wherein the managing step further comprises recommending one or more actions when an accuracy percentage of the predicting step falls below a given threshold level.

6. The method of claim 1, wherein the multiple tasks are associated with one or more launch orchestration program processes.

7. The method of claim 1, wherein the machine learning module executes a random forest algorithm.

8. An apparatus comprising:

a processor operatively coupled to a memory and configured to:

manage multiple tasks of multiple entities associated with a deployment of a software program with a deployment framework comprising a machine learning module configured to assist with managing the multiple tasks of the multiple entities, wherein in performing the managing, the processor is configured to predict a time taken for a given one of the multiple entities to complete a given one of the multiple tasks;

receive a modification to the predicted time; and input the modification as training data to a machine learning model executed by the machine learning module:

wherein in performing the predicting, the processor is configured to input a multi-dimensional feature vector to the machine learning model executed by the machine learning module;

wherein features of the multi-dimensional feature vector comprise:

data identifying each of the multiple tasks;

data identifying a number of the multiple entities performing each of the multiple tasks; and data identifying which of the multiple entities are performing each of the multiple tasks;

wherein the data identifying which of the multiple entities are performing each of the multiple tasks comprises data identifying one or more components performing version control for code management, gateway creation and message-oriented-middleware provider validation in connection with a release of the software program; and wherein the training data for the machine learning model further comprises the features of the multi-dimensional feature vector.

9. The apparatus of claim 8, wherein in performing the managing, the processor is further configured to track a status of one or more of the multiple tasks.

10. The apparatus of claim 9, wherein the tracking is performed in real-time.

11. The apparatus of claim 9, wherein in performing the managing, the processor is further configured to notify one or more of the multiple entities regarding the status of one or more of the multiple tasks.

12. The apparatus of claim 8, wherein in performing the managing, the processor is further configured to recommend one or more actions when an accuracy percentage of the predicting step falls below a given threshold level.

13. The apparatus of claim 8, wherein the multiple tasks are associated with one or more launch orchestration program processes.

14. The apparatus of claim 8, wherein the machine learning module executes a random forest algorithm.

15. An article of manufacture comprising a non-transitory processor-readable storage medium having stored therein program code of one or more software programs, wherein the program code when executed by at least one processing device causes said at least one processing device to perform the steps of:

managing multiple tasks of multiple entities associated with a deployment of a software program with a deployment framework comprising a machine learning module configured to assist with managing the multiple tasks of the multiple entities, wherein the managing step comprises predicting a time taken for a given one of the multiple entities to complete a given one of the multiple tasks;

receiving a modification to the predicted time; and inputting the modification as training data to a machine learning model executed by the machine learning module;

wherein the predicting step comprises inputting a multi-dimensional feature vector to the machine learning model executed by the machine learning module;

wherein features of the multi-dimensional feature vector comprise:

data identifying each of the multiple tasks;

data identifying a number of the multiple entities performing each of the multiple tasks; and data identifying which of the multiple entities are performing each of the multiple tasks;

wherein the data identifying which of the multiple entities are performing each of the multiple tasks comprises data identifying one or more components performing version control for code management, gateway creation and message-oriented-middleware provider validation in connection with a release of the software program; and wherein the training data for the machine learning model further comprises the features of the multi-dimensional feature vector.

16. The article of manufacture of claim 15, wherein the managing step further comprises recommending one or more actions when an accuracy percentage of the predicting step falls below a given threshold level.

17. The article of manufacture of claim 15, wherein the multiple tasks are associated with one or more launch orchestration program processes.

18. The article of manufacture of claim 15, wherein the managing step further comprises tracking a status of one or more of the multiple tasks.

19. The article of manufacture of claim 18, wherein the tracking is performed in real-time.

20. The article of manufacture of claim 18, wherein the managing step further comprises notifying one or more of the multiple entities regarding the status of one or more of the multiple tasks.

* * * * *